United States Patent
Wykoff et al.

(10) Patent No.: US 9,017,796 B2
(45) Date of Patent: Apr. 28, 2015

(54) BONDED SHEET MOLDING COMPOSITE AUTOMOTIVE COMPONENTS WITHOUT SURFACE PRE-TREATMENT

(75) Inventors: Richard H. Wykoff, Commerce Township, MI (US); Daniel Q. Houston, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 555 days.

(21) Appl. No.: 13/411,968

(22) Filed: Mar. 5, 2012

(65) Prior Publication Data

US 2013/0230691 A1   Sep. 5, 2013

(51) Int. Cl.
| | |
|---|---|
| B32B 3/00 | (2006.01) |
| B29C 43/36 | (2006.01) |
| B32B 3/30 | (2006.01) |
| B29C 65/48 | (2006.01) |
| B29C 43/02 | (2006.01) |
| B29K 103/04 | (2006.01) |
| B29C 65/00 | (2006.01) |

(52) U.S. Cl.
CPC .......... *B29C 43/36* (2013.01); *Y10T 428/24355* (2015.01); *Y10T 156/1043* (2015.01); *Y10T 156/1002* (2015.01); *B32B 3/00* (2013.01); *B32B 3/30* (2013.01); *B29C 43/021* (2013.01); *B29K 2103/04* (2013.01); *B29C 65/483* (2013.01); *B29C 66/02245* (2013.01); *B29C 66/028* (2013.01); *B29C 66/1312* (2013.01); *B29C 66/7212* (2013.01); *B29C 66/72143* (2013.01); *B29C 66/723* (2013.01); *B29C 66/73161* (2013.01); *B29C 66/542* (2013.01)

(58) Field of Classification Search
CPC .............. B32B 3/00; B32B 3/28; B32B 3/30; B32B 5/26; B32B 25/02; B32B 27/12
USPC .............. 428/156, 161, 172, 297.1, 300.7, 31
See application file for complete search history.

(56) References Cited

U.S. PATENT DOCUMENTS 4,526,831 A * 7/1985 Hatchadoorian et al. .. 428/300.7
7,972,129 B2   7/2011 O'Donoghue
(Continued)

OTHER PUBLICATIONS

Flax, Arthur M., Capabilities of Sheet Molding Composite in the Automotive Industry: An Overview, SAE-910383, Feb. 25-Mar. 1, 1991.
(Continued)

*Primary Examiner* — Catherine A Simone
(74) *Attorney, Agent, or Firm* — Damian Porcari; MacMillan, Sobanski & Todd, LLC

(57) ABSTRACT

An automotive assembly comprises a sheet molding composite (SMC) element comprising an SMC sheet body shaped into a generally smooth functional section and at least one generally planar bonding section. The bonding section comprises a textured surface impressed as a result of molding the SMC sheet body in a compression molding tool having a corresponding textured pattern. The textured surface has a predetermined surface roughness for increasing the effective surface area of the bonding section relative to a non-textured surface. The predetermined surface roughness is in a range from 0.25 $R_a$ (µm) to 8.5 $R_a$ (µm). A second element has a secondary bonding surface adjoining the bonding section of the SMC element. An adhesive joins the secondary bonding surface to the bonding section without requiring any pre-treatment of the bonding section.

4 Claims, 3 Drawing Sheets

(56) References Cited

U.S. PATENT DOCUMENTS

2005/0137615 A1 6/2005 Mapes et al.
2008/0241296 A1 10/2008 Wang et al.

OTHER PUBLICATIONS

Wingfield, J.R.J., Treatment of Composite Surfaces for Adhesive Bonding, Int. J. Adhesion and Adhesives vol. 13 No. 3 Jul. 1993, pp. 151-156.

* cited by examiner

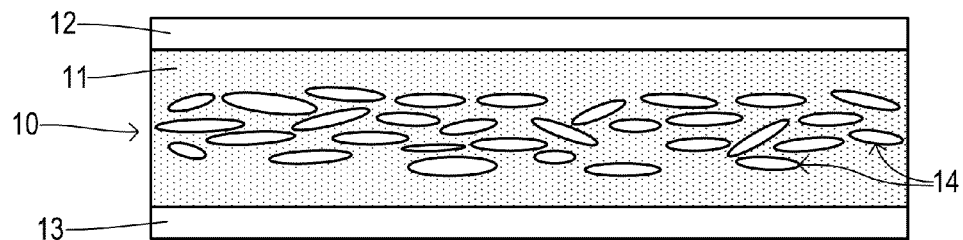
Fig. 1
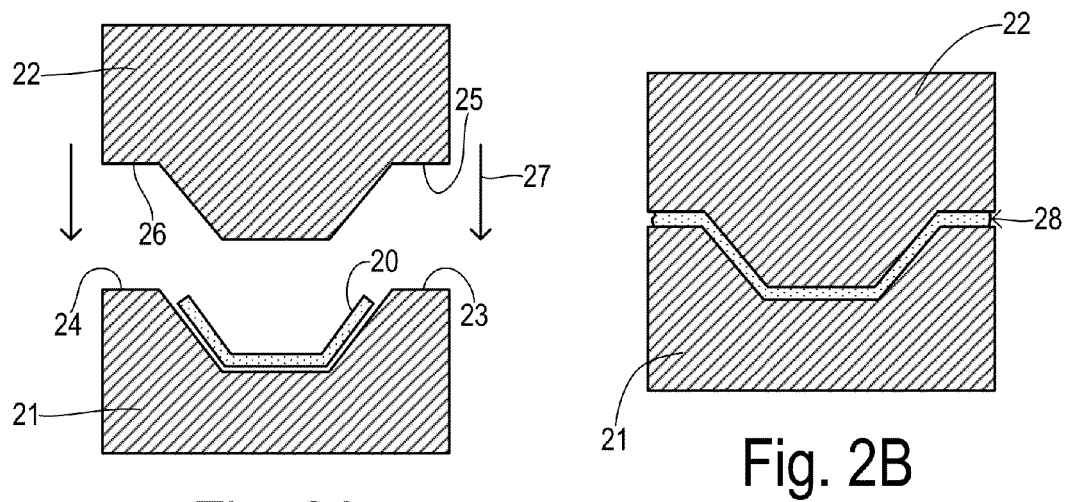
Fig. 2A
Fig. 2B
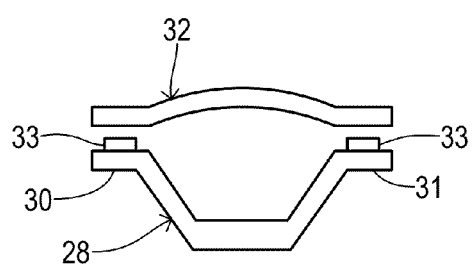
Fig. 3A
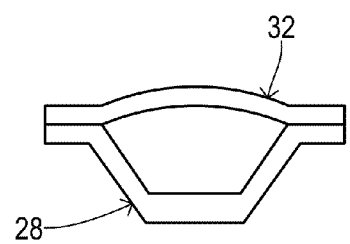
Fig. 3B

BONDED SHEET MOLDING COMPOSITE AUTOMOTIVE COMPONENTS WITHOUT SURFACE PRE-TREATMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive assemblies comprising sheet molding composites, and, more specifically, to improved adhesive bonding of a sheet molding composite (SMC) element to other elements.

Sheet molding composite (SMC) materials have been used and are being investigated for making various kinds of structural automotive components such as body panels (e.g., hoods, fenders, decklids, pickup boxes, pillars, lift gates, and roofs), engine components (e.g., valve covers and oil pans), vehicle frame elements, bumper beams, fan shrouds, and many other types of components. The use of SMC materials has many advantages over steel and other types of composite material such as hand-laid fiberglass including lower weight, greater consolidation of parts, ability to use less complex and expensive tooling for molding the parts, greater range of component styling, and short cycle times for the molding processes.

An SMC sheet or body is comprised of a sandwich formed with a resin paste and chopped glass fibers between sheets of carrier films. Typically, one film is advanced under a box of resin paste which is deposited onto the film. Glass fibers are threaded through a chopping machine which cuts pieces of predetermined lengths and randomly deposits them onto the advancing film and resin paste. A second film having additional resin paste deposited on it is laid atop the first film and compacted into a sandwich that may be rolled up or folded for later use in a compression mold to form an SMC molded part.

A typical resin paste may be comprised of a filler (such as calcium carbonate), polyester, a lower profile additive (such as polyvinyl acetate or urethane), catalyst, a pigment, and other agents. Due to the initial placement of the fibers at the center of the sandwich, they generally remain at the interior portions of a molded part away from the surface.

A typical SMC element molded as part of an automotive assembly includes a functional section (e.g., for providing a Class A visible surface of a panel) and an attachment section for joining the SMC element to other parts within an assembly. One desirable manner for joining an SMC element to other elements is by adhesive bonding. In order to obtain good adhesion, however, a bonding pad on the SMC element for receiving adhesive must usually be pre-treated because the smooth surface on a typical SMC bonding pad after compression molding lacks good adhesive characteristics.

Compression molding tools for SMC components typically employ highly polished tool surfaces to achieve sufficient Class A surface quality. Chrome is usually deposited on the surfaces to achieve a high wear capability during the molding process. Chrome helps resist the highly abrasive nature of the SMC material during molding.

The smooth surface of an SMC bonding pad has been prepared for bonding by various pre-treatment methods known in the prior art, including electrical discharge treatment, plasma treatment, flame treatment, laser etching, grit-blasting, sanding, and washing with solvents. Such treatments improve joint strength obtained by adhesive bonding. However, they result in undesirable costs, additional processing, and environmental consequences. It would be desirable to increase joint strength without requiring any such pre-treatments.

SUMMARY OF THE INVENTION

In one aspect of the invention, an automotive assembly comprises a sheet molding composite (SMC) element comprising an SMC sheet body shaped into a generally smooth functional section and at least one generally planar bonding section. The bonding section comprises a textured surface impressed as a result of molding the SMC sheet body in a compression molding tool having a corresponding textured pattern. The textured surface has a predetermined surface roughness for increasing the effective surface area of the bonding section relative to a non-textured surface. The predetermined surface roughness is in a range from 0.25 $R_a$ (μm) to 8.5 $R_a$ (μm). A second element has a secondary bonding surface adjoining the bonding section of the SMC element. An adhesive joins the secondary bonding surface to the bonding section.

BRIEF DESCRIPTION OF THE DRAWINGS

FIG. 1 is a cross-sectional view of an SMC body.

FIGS. 2A and 2B are cross sections of an SMC body in a compression mold before and after compression, respectively.

FIGS. 3A and 3B are end views of a structural assembly wherein at least one element of the assembly is formed from an SMC body and has a bonding section with a textured surface according to the present invention.

DETAILED DESCRIPTION OF PREFERRED EMBODIMENTS

Figure 4:
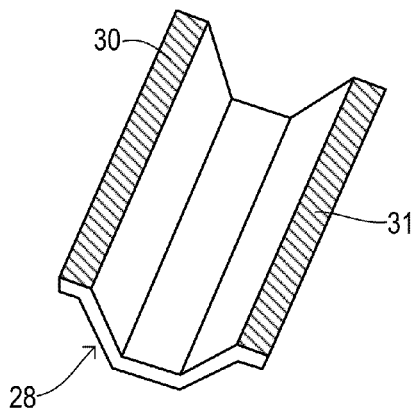
FIG. 4 is a perspective view of an SMC structural element.

Referring now to FIG. 1, an SMC body 10 is comprised of a resin paste 11 between a pair of films 12 and 13. A plurality of fibers 14 are embedded in resin paste 11.

An SMC body 20 may be inserted into a cavity in a compression molding tool having a lower portion 21 and an upper portion 22 configured to provide a mold cavity in the shape of a desired final SMC element. Lower tooling die 21 has bonding pad portions 23 and 24 and upper tooling die 22 has bonding pad sections 25 and 26, which are all conventionally given a smooth surface. Dies 21 and 22 are brought together to compress SMC body 20 while heat is applied in order to compression mold an SMC element 28 as shown in FIG. 2B.

As shown in FIGS. 3A and 3B, SMC element 28 has bonding sections 30 and 31 for bonding with a second element 32 in an automotive assembly. Bonding section 30 and 31 were conventionally pre-treated for better adherence of an adhesive 33 for joining elements 28 and 32 as shown in FIG. 3B.

FIG. 4 shows bonding sections 30 and 31 on SMC element 28 intended to receive the adhesive. Bonding surfaces 30 and 31 are compression molded and, therefore, had a smooth surface in the prior art due to a desire to provide a long lifetime for the compression molding die tools that interface with the SMC material. In order to deal with the abrasive tendencies of the SMC material, and due to the desire to obtain a smooth, blemish-free surface on all Class A portions of compression molded elements, all tooling surfaces have conventionally been polished smooth and then coated with chrome. Due to the smooth surfaces of bonding sections 30 and 31, pretreatment was necessary when using adhesive bonding.

Figure 5:
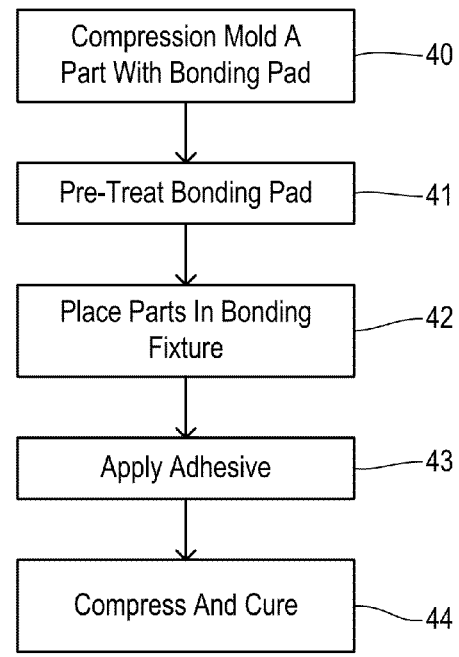
FIG. 5 is a flowchart showing conventional processing of an SMC element prior to adhesive bonding.

One conventional prior art manufacturing method is shown in FIG. 5 wherein an SMC part is compression molded with a bonding pad in step 40. The bonding pad on the SMC part is then pre-treated in step 41 in order to roughen or activate the surface. In step 42, the SMC part and a second part to which it is being bonded are placed in a bonding fixture. Adhesive is applied in step 43, and the parts are compressed and the adhesive is allowed to cure in step 44. The surface treatment such as scuff sanding, flame treatment, and plasma treatment that have been routinely required to achieve acceptable bond performance were time consuming, labor intensive, and resulted in additional costs for the manufacturing of SMC components.

Figure 6:
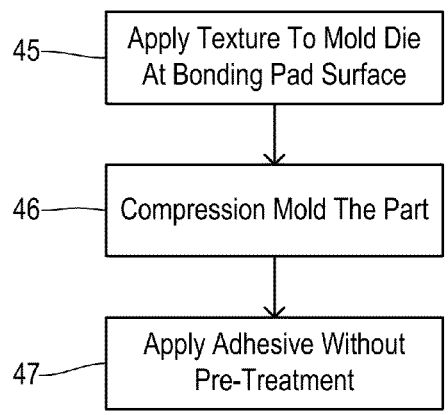
FIG. 6 is a flowchart showing an improved method of the present invention for adhesively bonding an SMC element without conventional pre-treatment.

The present invention enhances SMC bonding by incorporating a textured tool surface for the bonding pads to obtain superior bonding adhesion without the need for pre-treatments. By deliberately introducing a predetermined surface roughness created by the mold at the bonding pad areas, an increased area of the bond surface is created which in turn provides increased joint strength. In one embodiment of a method of the present invention shown in FIG. 6, a texture is applied to a mold tooling die at the bonding pad surface in step 45. An SMC part is compression molded in step 46. In step 47, adhesive is applied to the bonding pad without pre-treatment. Thereafter, the parts to be bonded are compressed and the adhesive is cured in a conventional manner. The second component can be made of any desired material including a second SMC element with bonding pads similarly textured for ensuring excellent joint strength.

Figure 7:
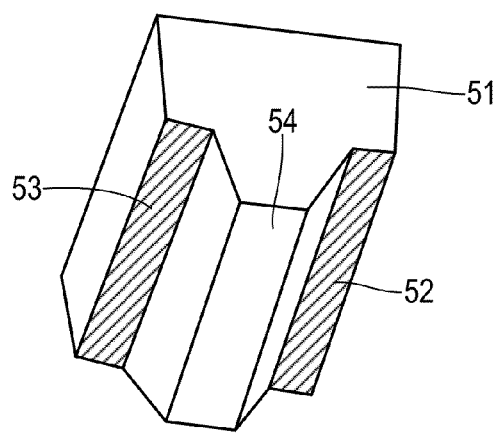
FIG. 7 is a perspective view of a portion of a compression mold according to one embodiment of the present invention.

FIG. 7 shows a tooling die 51 having bonding pad portions 52 and 53 and a functional portion 54. Portions 52 and 53 have a predetermined surface roughness for increasing the effective surface area relative to a non-textured surface. Preferably, the predetermined surface roughness is in a range from 0.25 $R_a$ (μm) to 8.5 $R_a$ (μm). Textured surfaces 52 and 53 impress a corresponding texture into the SMC sheet body during compression molding so that the corresponding generally planar bonding sections on the SMC element are produced with the desired surface roughness, leading to enhanced joint strength when adhesively bonded.

Figure 8:
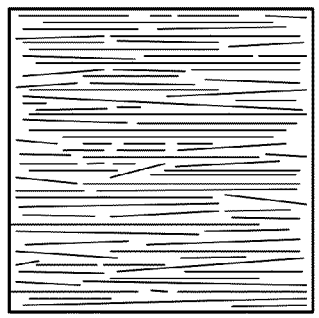
FIG. 8 is a plan view of one embodiment of a textured surface according to one embodiment of the present invention.

Various textures can be employed to achieve the desired surface roughness. In one example, a multiplicity of lineal "scratches" is employed as shown in FIG. 8. Such scratches can be formed on the molding die by etching or machining to create a surface similar to what would result from scratching with sandpaper of various grits as reflected in the following table.

| Sample | Grit | Direction | $R_a$ (μm) |
|---|---|---|---|
| 1 | 400 | Parallel | 0.35 |
| 2 | 400 | Transverse | 0.25 |
| 3 | 240 | Parallel | 0.84 |
| 4 | 240 | Transverse | 0.72 |
| 5 | 120 | Parallel | 1.47 |
| 6 | 120 | Transverse | 1.48 |
| 7 | 80 | Parallel | 3.6 |
| 8 | 80 | Transverse | 5.64 |

Direction refers to whether the roughness measurement (e.g., using a profilometer) is taken in a direction parallel or transverse with the direction of the "scratches". Samples 1 and 2 correspond to altering of the tooling surface in a manner equivalent to a 400 grit sandpaper in a direction parallel and transverse to the measurement direction, respectively. The resulting surface roughness for die samples 1 and 2 produce a value of $R_a$ of 0.35 and 0.25, respectively. As known in the art, $R_a$ is the arithmetic average of vertical deviations in a roughness profile.

In samples 3 and 4, a texture corresponding to a 240 grit sandpaper produces roughness $R_a$ with values of 0.84 and 0.72, respectively. Altering the tooling surface equivalent to sandpaper grits of 120 and 80 result in the surface roughness as shown in the table. Using a texture that is coarser than 80 may be undesirable because the corresponding surface roughness would tend to expose internal fibers. A finer texture than 400 would be undesirable since insufficient surface roughness would be created and no significant increase in mechanical joint strength would be obtained. The most preferable range in predetermined surface roughness lies from about 0.35 $R_a$ to about 3.6 $R_a$ (μm).

Figure 9:
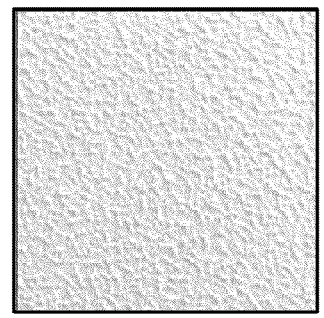
FIG. 9 is a plan view of one embodiment of a textured surface according to another embodiment of the present invention.

FIG. 9 shows an alternative texture wherein any common stipple pattern with a grain exhibiting the desired surface roughness may be employed. Any stipple pattern could be selected provided that the roughness $R_a$ of the stipple pattern falls in the range from 0.25 $R_a$ (μm) to 8.5 $R_a$ (μm).

Figure 10:
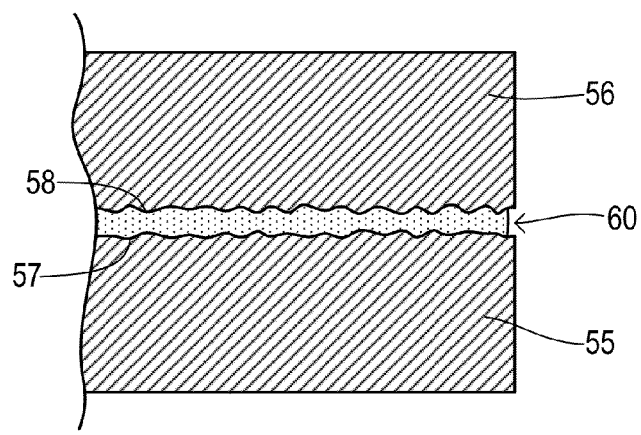
FIG. 10 is a cross section through an adhesive bond joining an SMC element with a second element.

FIG. 10 shows a first SMC element 55 and a second SMC element 56 with textured surfaces 57 and 58 having the predetermined surface roughness. An adhesive 60 has been applied and cured between textured surfaces 57 and 58. The respective surface areas of each SMC element that are in contact with adhesive 60 are increased relative to a non-textured surface to thereby increase joint strength. The surface texture is applied in a manner that avoids disruption of the internal fibers which could otherwise lead to delamination if fibers extended out from the SMC surface.

What is claimed is:
1. An automotive assembly comprising:
a sheet molding composite (SMC) element comprising an SMC sheet body shaped into a generally smooth functional section and at least one generally planar bonding section, wherein the bonding section comprises a textured surface impressed as a result of molding the SMC sheet body in a compression molding tool having a corresponding textured pattern, wherein the textured surface has a predetermined surface roughness for increasing the effective surface area of the bonding section relative to a non-textured surface, wherein the predetermined surface roughness is in a range from 0.25 $R_a$ (μm) to 8.5 $R_a$ (μm), and wherein the textured pattern has an appearance of generally parallel scratches;

a second element having a secondary bonding surface adjoining the bonding section of the SMC element; and adhesive joining the secondary bonding surface to the bonding section.

2. The assembly of claim 1 wherein the predetermined surface roughness is in a range from about 0.35 $R_a$ (μm) to about 3.6 $R_a$ (μm) in a direction parallel with the scratches.

3. The assembly of claim 1 wherein the predetermined surface roughness is in a range from about 0.25 $R_a$ (μm) to about 5.64 $R_a$ (μm) in a direction transverse with the scratches.

4. An automotive assembly comprising:

a sheet molding composite (SMC) element comprising an SMC sheet body shaped into a generally smooth functional section and at least one generally planar bonding section, wherein the bonding section comprises a textured surface impressed as a result of molding the SMC sheet body in a compression molding tool having a corresponding textured pattern, wherein the textured surface has a predetermined surface roughness for increasing the effective surface area of the bonding section relative to a non-textured surface, wherein the predetermined surface roughness is in a range from 0.25 $R_a$ (μm) to 8.5 $R_a$ (μm);

a second element having a secondary bonding surface adjoining the bonding section of the SMC element, wherein the second element is comprised of a second SMC sheet body shaped into a generally smooth second functional section adjacent the secondary bonding surface, wherein the secondary bonding surface has a second texture impressed as a result of molding the second SMC sheet body in a compression molding tool having a corresponding second textured pattern, wherein the second texture has a second predetermined surface roughness for increasing the effective surface area of the bonding section relative to a non-textured surface, wherein the second predetermined surface roughness is in a range from 0.25 $R_a$ (μm) to 8.5 $R_a$ (μm); and adhesive joining the secondary bonding surface to the bonding section.

* * * * *